Patented Feb. 26, 1946

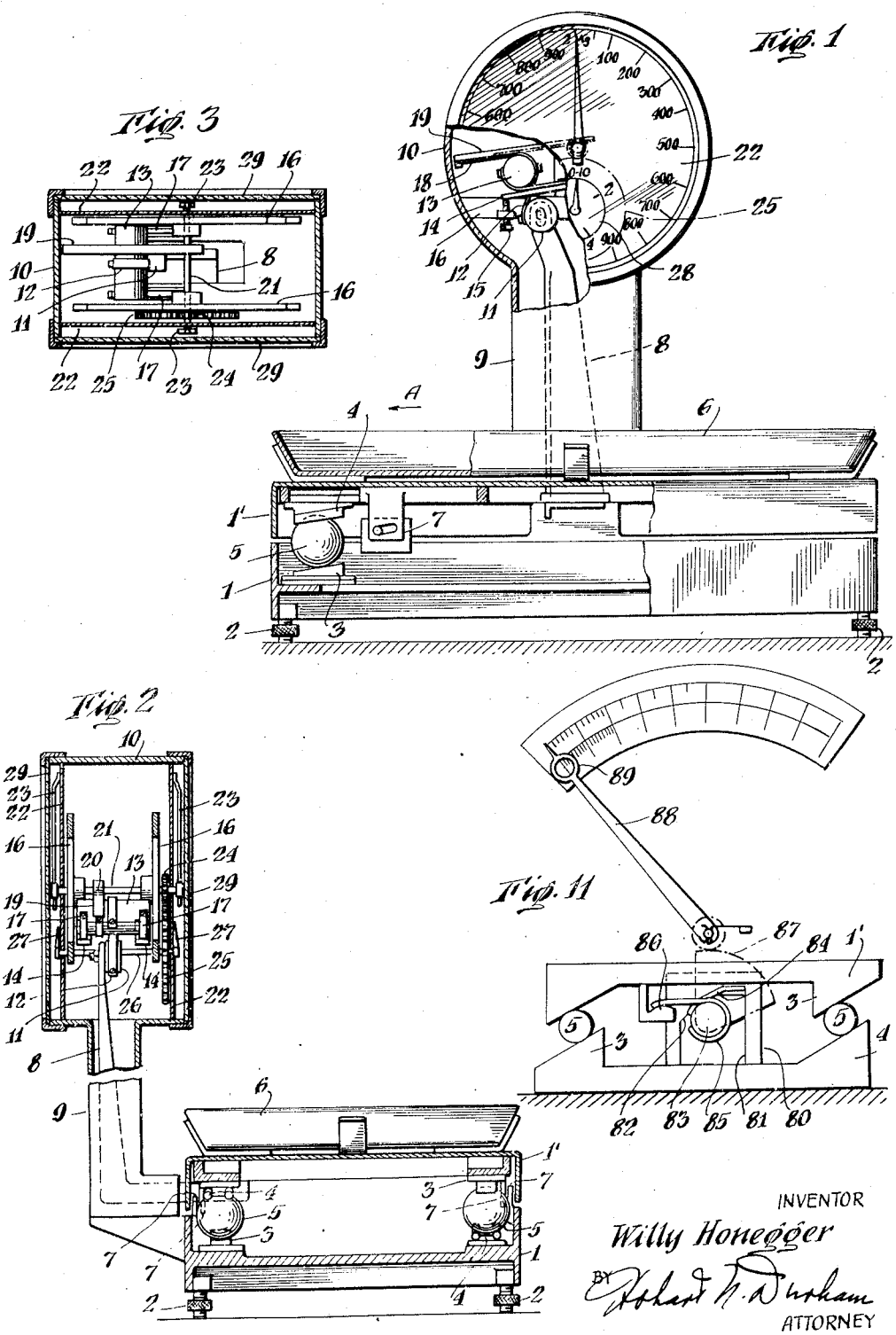

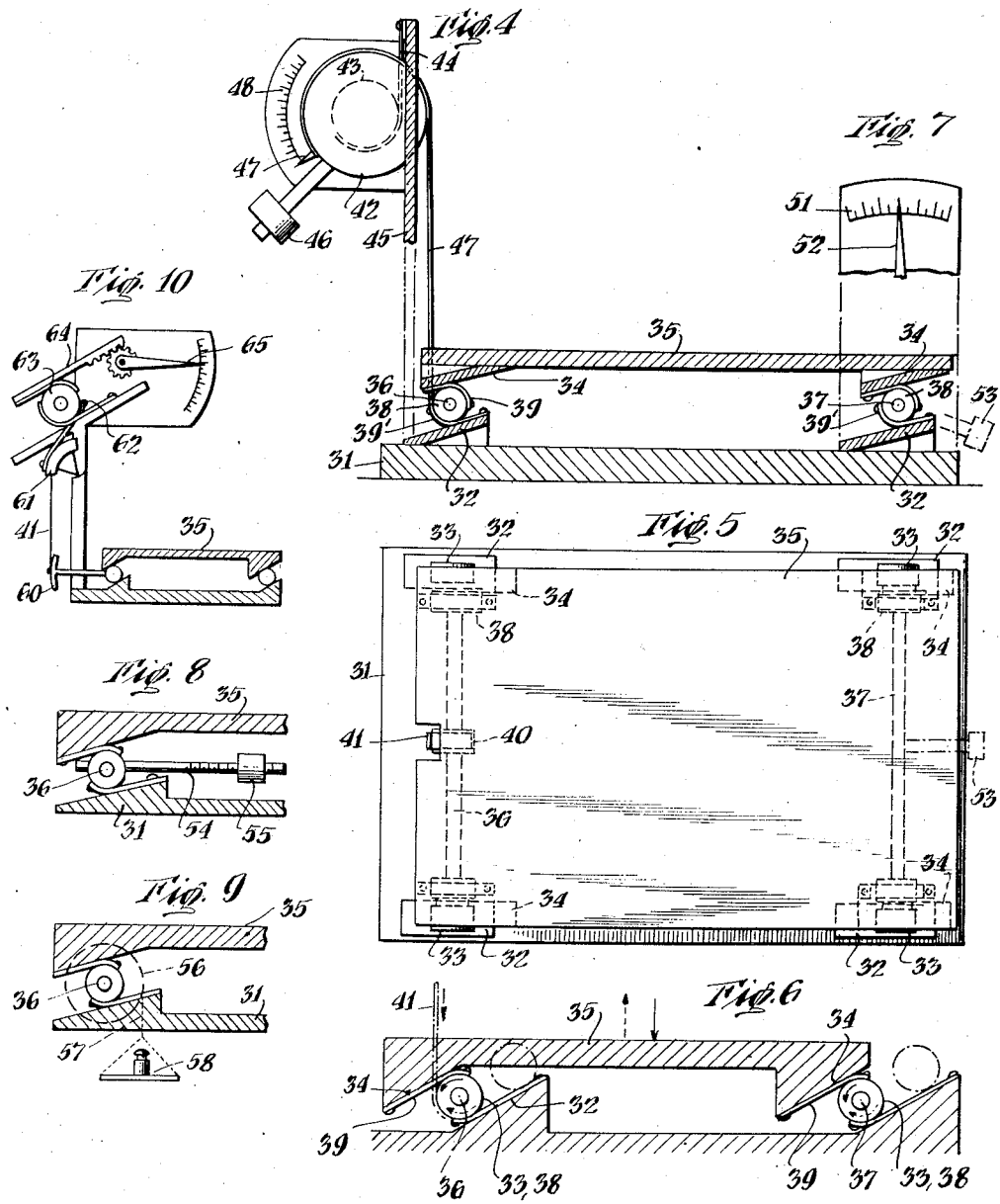

2,395,784

UNITED STATES PATENT OFFICE 2,395,784

WEIGHING APPARATUS

Willy Honegger, Zurich, Switzerland

Application November 8, 1943, Serial No. 509,376
In Switzerland October 24, 1942

8 Claims. (Cl. 265—27)

The present invention relates to a weighing apparatus in which a scale pan or other load-carrier is supported by means of rolling bodies on bearing surfaces disposed at an angle to the horizontal, and in which apparatus the distortion of the rolling body system is transmitted to an index mechanism. A weighing balance of this kind possesses great merits. The necessity of using a knife-edge balancing is avoided and difficulties applying to the fine adjustment of the knives overcome. The rolling bodies and raceways employed as hereinafter described can be manufactured by ordinary machine tools at a cost of but little time and labour.

I attain these and related objects by the bearing structure shown in the accompanying drawings showing various embodiments incorporating the invention, in which:

Fig. 1 is a front view, partially in transverse section, of one form of embodiment;

Fig. 2 illustrates a sectional end view elevation, and

Fig. 3, a horizontal section through the casing of the index mechanism shown in Fig. 1;

Fig. 4 is a vertical longitudinal section, showing essential parts of a second form of embodiment of the invention;

Fig. 5 is a top view thereof, and

Fig. 6 shows an intermediate position of the apparatus shown in Figs. 4 and 5 under load;

Figs. 7 to 11 represent further modified forms of embodiment of the invention in outline diagrams.

In the form of embodiment of the invention shown in Figs. 1 to 3, a two-part housing comprising superposed sections 1, 1' is employed, the lower section 1 being provided with feet 2 which are individually adjustable to accurately level the housing on a supporting surface. In each corner of the housing 1, 1' there is a supporting arrangement comprising a bearing member 3 and a bearing and guide member 4 between which a ball 5 is located. The raceways of the balls 5 of all four supports are disposed at an equal angle with respect to the horizontal. The bearing member 3 has a plain supporting surface for the ball 5. The bearing and guide 4 member also has a plain supporting surface for the ball, but includes two guide flanges or rails 4' placed parallel to each other and between which the ball 5 runs. At diagonally opposite supporting points in the housing 1, 1' the bearings 3 and 4 are alternately fastened to the bottom part 1 and to the top part 1' of the housing. Due to this arrangement of the bearings 3 and guides 4 of the supports with respect to each other, a very simple and effective supporting and accurate guiding means for the balls is provided. The top housing part 1', which is readily removable from the bottom housing part 1, carries a scale-pan or platform 6 for the reception of the material or article to be weighed. The operating travel of the top part 1' on the bottom part 1 is limited by suitable stop means indicated at 7 in Fig. 1. To the upper part 1' of the housing a motion transmitting arm 8 is fixed which projects into the casing 10 of the index mechanism through a hollow standard 9. The upper end of the motion transmitting arm 8 carries a circular disc 11, to the curved surface of which one end of a steel strap 12 is attached. This strap arches partially over the circumference of a roller 13, and is fastened at its opposite end thereto. The roller 13 runs on two rails 14 parallel with each other and arranged at an angle to the horizontal. The rails 14 are pivotally mounted at one end and adjustable to dispose them at a properly inclined position by means of set screws 15 mounted on a frame 16 which is secured to the casing 10. The slanting position of the rails 14 should correspond to that of the bearings 3 and 4. To the curved surface of the roller 13 are fixed the upper ends of two steel straps 17 which are led round the roller 13, the other or lower ends of said straps being fixed to the two rails 14. Consequently, the range of motion of the roller 13 is limited to a certain extent by these straps. A reciprocatory rack 19 resting on the roller 13 engages the teeth 20 of a pinion on a pointer shaft 21. The rack 19 is connected to the roller 13 by means of a steel strap 18. The shaft 21 carries pointers 23 arranged to move over dials 22, together with a gear 24 meshing with a gear wheel 25 on a shaft carrying two pointers 27.

If a load to be weighed is deposited on the scale-pan 6, the latter is caused to travel with the top part 1' in the direction indicated by the arrow A (Fig. 1). In this movement the balls 5 roll on the bearings 3 and 4. The motion of the top part 1' is transmitted through the motion transmitting arm 8 to the disc 11 and to the strap 12 which thus causes the roller 13 to turn clockwise (Fig. 1). The roller 13, through strap 18, moves the rack 19 to the right. The latter turns the axle 21 with the pointers 23 which indicate the load-weight on the dials 22. Simultaneously the axle 26 with pointers 27 is also driven by means of the gear wheels 24, 25. The gear ratio of the latter is so chosen, that upon each single revolution of the pointers 23 (corresponding to a weight of, say, 2 kgs.), the pointers 27 register with the indicating numeral 2 on the small dials 28. Upon double revolution of the pointers 23, the pointers 27 will register with the numeral 4 on the dials 28, and so on. The measuring range of the illustrated weighing balance may be up to, say 10 kgs.

Glass panels 29 cover and protect the dials and pointers from external influences.

In the form of embodiment of the invention shown in Figs. 4 to 6, the numeral 31 designates the rectangular bed plate of a weighing apparatus, say a decimal balance. The bed plate 31 has at each corner a bearing member 32 arranged at an angle to the horizontal. On each support 32 rests a roller 33 contacting with an inclined bearing member on the scale-pan or load carrier 35. The rollers 33 at opposite ends of the bed plate are mounted on transverse shafts 36 and 37, respectively. On the shafts 36, 37, discs 38 are also mounted which are of approximately the same size as the rollers 33. These discs 38 are partially embraced by steel straps 39, 39'. The straps 39 are at one end attached to the discs 38 and at the other end to the bearing members 34 on the load carrier 35, while the straps 39' are attached at one end to the discs 38 and at the other end to the bearing members 32 on the bed plate 31. The shaft 36 carries a disc 40 to which one end of a strap 41 is fixed, the other end of the strap being fastened to a disc 42 suitably journaled on the frame 45. With the disc 42 is connected another disc 43 of smaller diameter, which is loosely supported on the frame 45 by means of a strap 44. The disc 42 bears a load-counterpoise 46, and a pointer 47, the latter being arranged to move over a dial 48 mounted on the frame 45. It is understood that the pointer could be operated by rack and pinion mechanism.

The action of the balance under load appears from Fig. 6. The full line arrows represent the directions of motion of the parts 33, 35, 36, 37, 38 and 41 with their setting in the weighing position. The broken line arrows indicate the direction of motion of the said parts when reset or returned to the normal position.

As shown in Fig. 7, the index mechanism could also be operated directly from the axis 37. In this case the bed plate would be fitted with a dial 51, over which the pointer 52, carried by the shaft 37, would move (Fig. 4). A resetting weight 53 attached to a lever-arm on the shaft 37 could be used with this construction. In place of the shown cylindrical bearing rollers other forms of rotary bearing members might be used.

The index- or counterbalancing system could also be constructed as shown in Figs. 8 and 9. On one of the axles 36, 37, there might be provided a one-armed lever 54 with adjustable weight 55 in the manner of a steelyard (Fig. 8). The axle 36 might also be provided with a disc 56 (Fig. 9) on which a weightpan 58 is suspended by means of a steel band 58.

Fig. 10 illustrates another form of embodiment of the invention. Here, the steel strap 41 is fixed to segments 60 and 61. To the segment 61 is secured one end of another steel strap 62, the other end of which is fastened to a roller 63, thus enabling the strap 62 to unwind from the roller 63. The rotation of the roller 63 is transmitted by a steel strap to the rack 64 and thence to a pointer 65.

Fig. 11 represents a still further form of embodiment of the invention. The load-carrier 1', the parts 3, 4 and the balls 5 are here supported by the bottom part 1 as in Fig. 1. To the bottom part 1 are fixed two upright bearing plates 80 with recesses or cut-outs 81. The recesses 81 have inclined bearing walls 82 for a cylindrical roller 83. To the curved surface of the roller 83 is connected one end of a steel strap 84 whose other end is attached to the rigid bearing 80. A second steel strap 85 is connected at one end to the roller 83 and at its other end to a bracket 86 on the top part 1'. The roller 83 bears against the walls 82 of the recesses 81, due to the action of the steel straps 84, 85. When under load, the part 1' moves forward and lowers and causes the roller 83 to turn through an appropriate amount. These turning movements are transmitted by a pointer mechanism 87, 88 movable over a suitably graduated dial. The pointer may be provided with a lens 89 to facilitate the reading of the graduation marks.

The number and dimensions of the rolling bodies employed in the aforementioned examples may be chosen in accordance with the size of the load to be weighed. Thereby the diameter of the rolling bodies, for example, may be such as to secure motion transmitting actions of such character that the divisions of the dial can be kept exactly equidistant from each other. The kind and arrangement of the means employed for resetting the parts after operation or returning them to initial position may be of any other type than those shown known in the art. An important feature of the invention resides in the use of raceways for a system of pointer-actuating rolling bodies supporting the load, so mounted that the displacement of the said system is effected by the load-carrier through the medium of strap-shaped transfer elements.

It is understood that the bearings 3 may also be provided with curved instead of plain surfaces and that they may be made partly or entirely of hardened steel, of glass or of synthetic materials.

Having thus described my invention, I claim:

1. A weighing apparatus including in combination a support, a reciprocatory load carrier movable in a plane inclined to the support, a driving roll, a connection between the load carrier and the driving roll whereby the driving roll is adapted to be oscillated by and through the movements of the load carrier, an indicator, a second oscillatory driving roll, a flexible strap connection between said rolls for oscillating the second named driving roll from the first-named driving roll, and means actuated by the second driving roll for operating the indicator.

2. A weighing apparatus including in combination a support, a load carrier movable in a plane inclined to the support, a casing mounted on the support and carrying an indicating dial and a pointer cooperating therewith, and motion transmitting means for operating the pointer including a motion transmitting member movable with the load carrier and extending into the casing, a roller rotated thereby, a rack actuated by the roller, the roller and rack being supported for travel in parallel inclined planes, and a gear connected with the pointer and meshing with the rack.

3. A weighing apparatus including in combination a support, a load carrier movable in a plane inclined to the support, a casing mounted on the support, a motion transmitting member movable with the load carrier and extending into the casing, an indicating means comprising primary and secondary indicators carried by the casing, a driving roller actuated by said member rack and pinion mechanism actuated thereby to operate the primary indicator, and a gearing actuated by said mechanism for operating the secondary indicator.

4. A weighing apparatus including in combination a support, a load carrier movable in a plane inclined to the support, roller bearings between the support and the load carrier, an indicating means comprising primary and secondary indicators, and a motion transmitting means for operating the indicating means including a driving roll actuated by the load carrier, a rack and pinion actuated by the driving roll for operating the primary indicator, and gearing actuated by the pinion for operating the secondary indicator.

5. A weighing apparatus including in combination a support, a load carrier movable in a plane inclined to the support, indicating means comprising primary and secondary indicators, and motion transmitting means for actuating the indicating means from the load carrier comprising an oscillatory driving roll actuated by the load carrier, operating connections between the roll and the primary indicator including a second driving roll and a rack and pinion actuated thereby for operating the primary indicator, and means operated by said rack and pinion for also operating the secondary indicator.

6. A weighing apparatus including in combination a support, a reciprocable load carrier movable in a plane inclined to the support, a rotary driving element oscillated by movement of the load carrier, a pivotally mounted indicator, a second rotary element intergeared with the indicator for actuating the same, and a motion transmitting flexible strap connection between said rotary elements.

7. A weighing apparatus including in combination a support, a reciprocable load carrier movable in a plane inclined to the support, a rotary element oscillated by movement of the load carrier, a pivotally mounted pointer, a pinion on the pointer, an oscillatory gear meshing with the pinion, and a motion transmitting flexible strap connection between the rotary element and the oscillatory gear.

8. A weighing apparatus including in combination a support, a reciprocatory load carrier movable in a plane inclined to the support, a motion transmitting element actuated by movement of the load carrier, an indicating casing having a dial and into which said motion transmitting element extends, a pivotally mounted pointer on the casing cooperating with the dial, an oscillatory element mounted in the casing independent of the motion transmitting element, a rack and pinion connection between said oscillatory element and the pointer, and a motion transmitting flexible strap connection between the motion transmitting element and the oscillatory element.

WILLY HONEGGER.